United States Patent
Ludwig et al.

(10) Patent No.: US 7,330,962 B2
(45) Date of Patent: Feb. 12, 2008

(54) DYNAMIC INSTRUCTION SEQUENCE SELECTION DURING SCHEDULING

(75) Inventors: Michael G. Ludwig, Sunnyvale, CA (US); Jayant B. Kolhe, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 143 days.

(21) Appl. No.: 11/274,602

(22) Filed: Nov. 14, 2005

(65) Prior Publication Data

US 2007/0113223 A1    May 17, 2007

(51) Int. Cl.
    *G06F 9/45* (2006.01)
(52) U.S. Cl. ...................................................... 712/214
(58) Field of Classification Search ................ 712/214; 717/132, 144, 145, 159, 161, 154; 703/22
    See application file for complete search history.

(56) References Cited

U.S. PATENT DOCUMENTS

| | | | | |
|---|---|---|---|---|
| 5,805,895 A | * | 9/1998 | Breternitz et al. | 717/160 |
| 5,835,776 A | * | 11/1998 | Tirumalai et al. | 717/161 |
| 5,850,552 A | * | 12/1998 | Odani et al. | 717/156 |
| 5,857,105 A | * | 1/1999 | Ayers et al. | 717/144 |
| 6,654,952 B1 | * | 11/2003 | Nair et al. | 717/157 |
| 6,895,580 B2 | * | 5/2005 | Bates et al. | 717/157 |
| 6,931,635 B2 | * | 8/2005 | Inagaki et al. | 717/157 |
| 7,058,561 B1 | * | 6/2006 | Kumar | 703/22 |

* cited by examiner

*Primary Examiner*—Eric Coleman
(74) *Attorney, Agent, or Firm*—Townsend and Townsend and Crew (57) ABSTRACT

A list scheduler in a compiler can select from a plurality of alternative instruction sequences for one or more computation performed within an application. A scheduler can initially identify and track one or more computations for which multiple alternative instruction sequences exist. An available instruction list can be populated with the alternative instruction sequences. The list scheduler can access the available instruction list during scheduling of the application. The list scheduler can perform a cost analysis while scheduling the instructions by performing a look ahead. The list scheduler may select alternate instruction sequences for similar computations occurring in different portions of the application based on the cost benefit analysis.

21 Claims, 3 Drawing Sheets

DYNAMIC INSTRUCTION SEQUENCE SELECTION DURING SCHEDULING

BACKGROUND OF THE DISCLOSURE

The present disclosure relates to the field of software processing. In particular, the present disclosure relates to dynamic instruction sequence selection performed during compiling of program code.

In typical software applications, an application is developed in what is referred to as a high level language that can be relatively independent of the type of hardware used to execute the application. The high level language can be compiled or otherwise translated into a hardware specific low level language instructions. The low level instructions can be loaded into a storage device, such as memory, and hardware can execute the instructions.

The development of increasingly complex hardware and processors enable the development of complex instructions sets that facilitate execution of particular types of applications. For example, a low level language associated with a processor that is configured to facilitate digital signal processing can implement complex instructions directed towards common digital signal processing operations. In digital signal processing, a typical operation requires a multiplication immediately followed by an accumulation that can be executed as an addition step. The multiply and accumulate may need to be performed hundreds or thousands of times within a particular application. A low level language may allow the multiplication and accumulation to be implemented in a single instruction, such as a MADD instruction, thereby reducing the total number of instructions needed in the application. Of course, the low level language can also include separate multiply and add instructions that can be used in instances where a distinct multiplication or addition is needed.

Because a low level language may include complex instructions that perform a combination of functions, there is the possibility of performing an identical operation using two or more equivalent instruction sequences. In the example provided above, a multiply and accumulate operation can be scheduled as a single MADD instruction or alternatively as separate multiply and add instructions.

Thus, many times a particular computation in an application can be compiled in multiple ways, using different instructions or sequence of instructions. Traditionally, the selection of instruction sequences corresponding to the computation is performed prior to the scheduling of instructions. However, in many cases, it is not possible to determine a priori which instruction sequence results in an optimal schedule for a given program.

The alternative instruction sequences that correspond to the same computation may utilize different hardware resources. A particular processor configuration can have multiple execution units and the execution of particular instructions may or may not be constrained to particular execution units. For example, some instructions may be limited to execute on specific execution units within a processor, while other instructions may be executed by any of a number of execution units.

The hardware constraints associated with particular instruction sequences further complicates instruction selection and scheduling. In some cases, it may be beneficial to use an instruction sequence that uses specific resources. In other cases, it may be beneficial to use an alternative instruction sequence that utilizes other machine resources. For example, in one case, it may be beneficial to select and schedule an instruction sequence that reduces dependency depth. In another case, it may be preferable to schedule an alternative instruction sequence for the similar computation because the alternative instruction sequence reduces the register pressure.

Thus, the problem of selecting an instruction sequence for a particular computation for which alternatives exist is complicated by the potential for different hardware utilization. The changes in allocation and consumption of machine resources makes it difficult to select a particular instruction sequence that would result in an optimal instruction sequence for the changing conditions occurring within the application.

BRIEF SUMMARY

A list scheduler in a compiler is disclosed that can select from a plurality of alternative instruction sequences for one or more computation performed within an application. The scheduler can initially identify and track one or more computations for which multiple alternative instruction sequences exist. An available instruction list can be populated with the alternative instruction sequences. The list scheduler can access the available instruction list during scheduling of the application. The list scheduler can perform a cost analysis while scheduling the instructions by performing a look ahead. The list scheduler may select alternate instruction sequences for similar computations occurring in different portions of the application based on the cost benefit analysis. The list scheduler can analyze machine resources required, including dependency depth and register cost when determining which of a plurality of available alternate instruction sequences is to be scheduled.

Methods and apparatus are disclosed for identifying candidate patterns for which a primary instruction pattern and one or more alternate instruction patterns exist. The availability of the alternative patterns can be tracked and a list scheduler can select which of the primary or alternative instructions are scheduled based on machine resource usage and requirements at the time of scheduling.

An embodiment of the invention includes a method of dynamic instruction scheduling that includes identifying within a block of program code to be scheduled a primary instruction pattern having at least one corresponding alternative instruction pattern, associating a head instruction of the primary instruction pattern to a head instruction of each of the at least one corresponding alternative instruction pattern, adding the head instruction of the primary instruction pattern and the head instructions of each of the at least one corresponding alternative instruction pattern to an available instruction list, and selecting one of the head instructions of the primary instruction pattern or at least one corresponding alternative instruction pattern for scheduling.

Another embodiment of the invention includes a method of dynamic instruction scheduling that includes scanning instructions in a block of program code for a primary instruction pattern having at least one corresponding alternative instruction pattern, generating the at least one corresponding alternative instruction pattern, linking a head instruction of each of the at least one corresponding alternative instruction pattern to a head instruction of the primary instruction pattern, populating an available instruction list with the head instructions of the primary instruction pattern and the at least one corresponding alternative instruction pattern, selecting a desired head instruction from the available instruction pattern using a reverse look ahead scheduler, and removing from the available instruction list the heads instructions linked to the desired head instruction.

Another embodiment of the invention includes a method of dynamic instruction scheduling that includes identifying within a program block to be scheduled a first instance of a primary instruction pattern, identifying within the program block a second instance of the primary instruction pattern, generating a plurality of alternative instruction patterns corresponding to the primary instruction pattern, scheduling, based at least in part on scheduling criteria, a first alternative instruction pattern in place of the first instance of the primary instruction pattern, and scheduling, based at least in part on scheduling criteria, a second alternative instruction pattern, distinct from the first alternative instruction pattern, in place of the second instance of the primary instruction pattern.

Another embodiment of the invention includes a system for dynamic instruction scheduling. The system includes an alternate pattern identifier configured to scan a block of program code to be scheduled for a primary instruction pattern, an alternate pattern generator configured to generate at least one alternative instruction pattern corresponding to the primary instruction pattern, an available list generator configured to add a head instruction from each of the primary instruction pattern and the at least one alternative instruction pattern to an available instruction list, a scheduling criteria module configured to generate at least one scheduling metric, and a scheduler configured to select a desired head instruction from the available instruction list based at least in part on the at least one scheduling metric.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

The problem of selecting an optimal sequence for computation for a program can be solved by maintaining multiple possible patterns of sequences in an available list for a list scheduler. The list scheduler can perform a cost analysis by executing a look ahead while scheduling instructions. A mechanism or method can be used to keep multiple sequences for same computation in available list of a list scheduler. The list schedule can execute a strategy to choose optimal instruction sequence from the available alternatives and can discard suboptimal sequences by performing a look-ahead and cost-benefit analysis.

Figure 1:
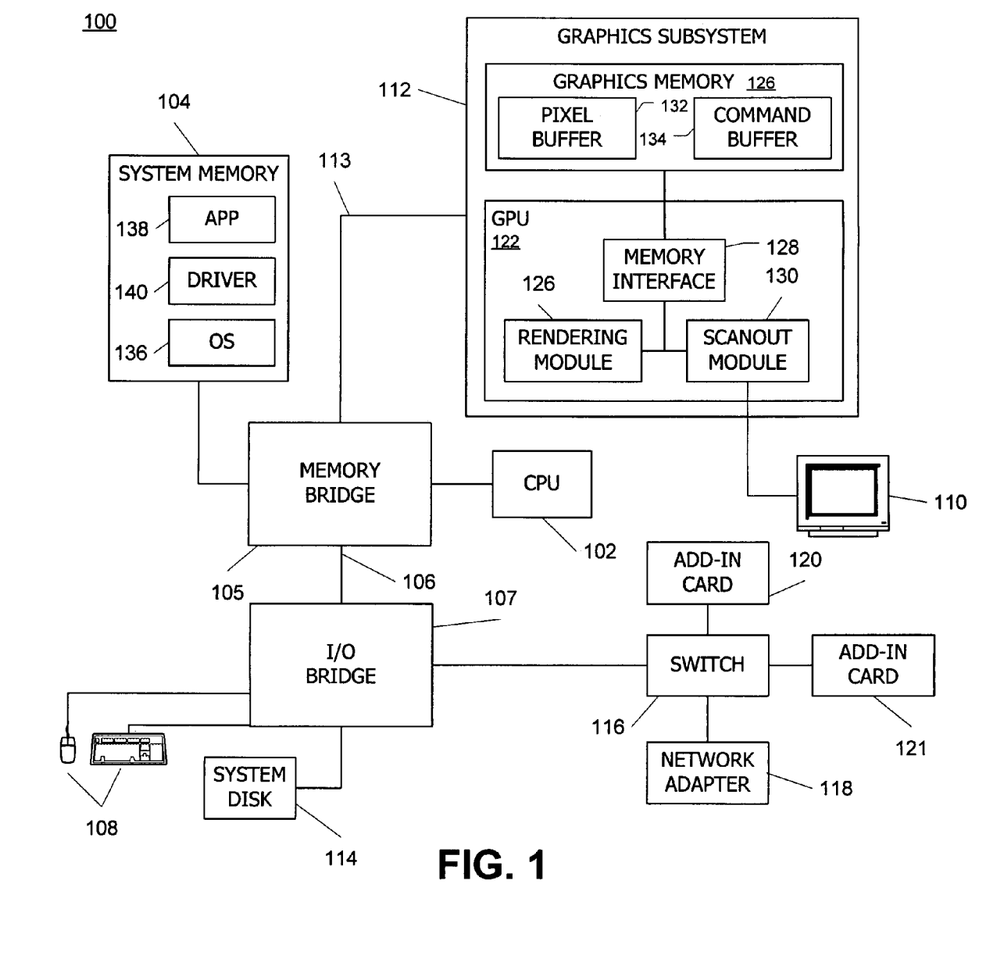
FIG. 1 is s simplified functional block diagram of an embodiment of a computer system.

FIG. 1 is a simplified block diagram of an embodiment of a computer system 100 according to an embodiment of the present invention. Computer system 100 includes a central processing unit (CPU) 102 and a system memory 104 communicating via a bus path that includes a memory bridge 105. Memory bridge 105 is connected via a bus 106 to an input/output (I/O) bridge 107. I/O bridge 107 receives user input from one or more user input devices 108 (e.g., keyboard, mouse) and forwards the input to CPU 102. Visual output is provided on a pixel based display device 110 (e.g., a conventional CRT or LCD based monitor) operating under control of a graphics processing subsystem 112 coupled to memory bridge 104 via a bus 113. A system disk 114 is also connected to I/O bridge 107. A switch 116 provides connections between I/O bridge 107 and other peripheral components such as a network adapter 118 and various add-in cards 120, 121. Other components (not explicitly shown), including removable-storage drives (e.g., floppy disk, compact disk (CD), and/or DVD drives) may also be connected to I/O bridge 107. In some embodiments, some or all of the connections may be implemented using other bus protocols, such as PCI (Peripheral Component Interconnect), PCI-Express (PCI-E), AGP (Advanced Graphics Processing), Hypertransport, or any other bus protocol(s).

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 includes a rendering module 126, a memory interface module 128, and a scanout module 130. Rendering module 126 may be configured to perform various tasks related to generating pixel data from graphics data supplied via bus 113 (e.g., implementing various 2-D and or 3-D rendering algorithms), interacting with memory interface 128 to store and update pixel data, and the like. Rendering module 126 is advantageously configured to generate pixel data from 2-D or 3-D scene data provided by various programs executing on CPU 102.

Memory interface module 128, which communicates with rendering module 126 and scanout module 130, manages all interactions with graphics memory 124. Memory interface module 128 may also include pathways for writing pixel data received via bus 113 to graphics memory 124 without processing by rendering module 128.

Graphics memory 124, which may be implemented using one or more integrated circuit memory devices of generally conventional design, may contain various physical or logical subdivisions, such as a pixel buffer 132 and a command buffer 134. Pixel buffer 132 stores pixel data for an image (or for a part of an image) that is read and processed by scanout module 130 and transmitted to display device 110 for display. This pixel data may be generated by rendering module 126, e.g., from 2-D or 3-D scene data provided via bus 113, or it may be generated by processes executing on CPU 102 and provided directly to pixel buffer 132 via bus 113.

Scanout module 130 reads pixel color data from pixel buffer 132 and transfers the data to display device 110 to be displayed. In one embodiment, scanout module 130 operates isochronously, scanning out frames of pixel data at a prescribed refresh rate (e.g., 80 Hz) regardless of any other activity that may be occurring in GPU 122 or elsewhere in system 100. In some embodiments, the prescribed refresh rate can be a user selectable parameter, and the scanout order may be varied as appropriate to the display format (e.g., interlaced or progressive scan). Scanout module 130 may also perform other operations, such as adjusting color values for particular display hardware and/or generating composite screen images by combining the pixel data from pixel buffer 132 with data for a video or cursor overlay image or the like, which may be obtained, e.g., from graphics memory 124, system memory 104, or another data source (not shown).

During operation of system 100, CPU 102 executes various programs that are (temporarily) resident in system memory 104. In one embodiment, these programs include one or more operating system (OS) programs 136, one or more application programs 138, and one or more driver programs 140 for controlling operation of GPU 122. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 114, and/or in other storage space.

Operating system programs 136 and/or application programs 138 may be of conventional design. An application program 138 may be, for instance, a video game program that generates graphics data and invokes appropriate functions of rendering module 126 in GPU 122 to transform the graphics data to pixel data. Another application program 138 may generate pixel data and provide the pixel data to graphics memory 124 for display by GPU 122. It is to be understood that any number of application programs that generate pixel and/or graphics data may be executing concurrently on CPU 102. Operating system programs 136 (e.g., the Graphical Device Interface (GDI) component of the Microsoft Windows operating system) may also generate pixel and/or graphics data to be processed by GPU 122.

Driver program 140 enables communication with GPU 122, including both rendering module 120 and scanout module 124. Driver program 140 advantageously implements one or more standard application program interfaces (APIs), such as Open GL, Microsoft DirectX, or D3D for communication with GPU 122; any number or combination of APIs may be supported, and in some embodiments separate driver programs 140 are provided to implement different APIs. By invoking appropriate API function calls, operating system programs 136 and/or application programs 138 instruct driver program 140 to transfer geometry data or pixel data to graphics processing subsystem 112, to control operations of rendering module 120, to modify state parameters for scanout module 124 and so on. The specific commands and/or data transmitted to graphics processing subsystem 112 by driver program 140 in response to an API function call may vary depending on the implementation of GPU 122, and driver program 140 may also transmit commands and/or data implementing additional functionality (e.g., special visual effects) not controlled by operating system programs 136 or application programs 138.

In some embodiments, command buffer 134 queues the commands received from driver program 140 for execution by GPU 122. More specifically, driver program 140 may write a command stream to command buffer 134; the stream may include rendering commands and data for rendering module 126 as well as state commands for scanout module 130. In some embodiments, command buffer 134 may include logically or physically separate sections for commands directed to rendering module 126 and commands directed to scanout module 130; in other embodiments, the commands may be intermixed in command buffer 134 and directed to the appropriate module by suitable control circuitry within GPU 122.

Command buffer 134 (or each section thereof) is advantageously implemented as a first in, first out buffer (FIFO) that is written by CPU 102 and read by GPU 122. Reading and writing can occur asynchronously. In one embodiment, CPU 102 periodically writes new commands and data to command buffer 134 at a location determined by a "put" pointer, which CPU 102 increments after each write. Asynchronously, GPU 122 may continuously read and process commands and data sets previously stored in command buffer 134. GPU 122 maintains a "get" pointer to identify the read location in command buffer 134, and the get pointer is incremented after each read. Provided that CPU 102 stays sufficiently far ahead of GPU 122, GPU 122 is able to render images without incurring idle time waiting for CPU 102. In some embodiments, depending on the size of the command buffer and the complexity of a scene, CPU 102 may write commands and data sets for frames several frames ahead of a frame being rendered by GPU 122. Command buffer 134 may be of fixed size (e.g., 5 megabytes) and may be written and read in a wraparound fashion (e.g., after writing to the last location, CPU 102 may reset the "put" pointer to the first location).

It will be appreciated that the system described herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination. It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying the present invention may be incorporated into a variety of devices, including general purpose computer systems, video game consoles and other special purpose computer systems, DVD players, handheld devices such as mobile phones or personal digital assistants, and so on.

Figure 2:
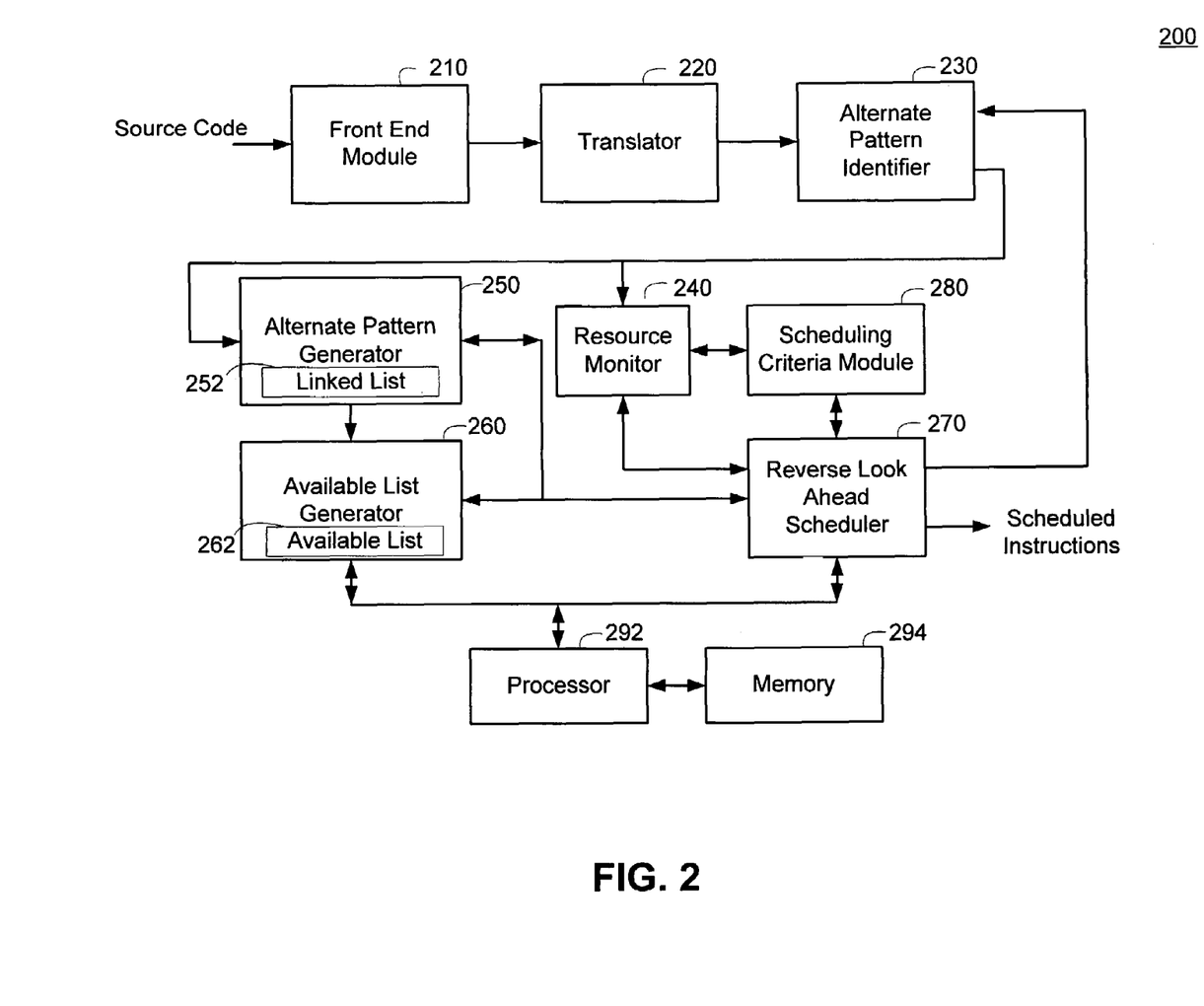
FIG. 2 is a functional block diagram of an embodiment of a system for dynamic instruction sequence selection.

FIG. 2 is a functional block diagram of an embodiment of a system 200 for dynamic instruction sequence selection. The system 200 can be implemented within a general purpose computer having a graphics processor, and can be configured to dynamically schedule the instructions for the graphics processor. Additionally, the system can be implemented in a standalone compiler targeting a CPU, Digital Signal Processor (DSP) or some other type of processor. Alternatively, the system 200 can be implemented within a graphics processing unit. Some or all of the modules in the system 200 can be implemented in hardware, software, or a combination of hardware and software. Where all or portions of a module are implemented in software, the software can be stored as one or more machine usable instructions in memory 294 and executed by a processor 292.

Although the processor 292 in FIG. 2 is shown as coupled to the available list generator 260 and the reverse look ahead scheduler 270, one of ordinary skill in the art will appreciate that the processor 292 may be coupled to additional modules within the system 200 and can be configured to perform some or all of the functions of the various modules.

In one embodiment, the system 200 can be implemented as a compiler that is configured to compile source code. The object code generated from the source code can be loaded in memory for execution by one or more processors in a software application. In one embodiment, the system 200 can operate as a compiler for source code to produce object code destined for graphics intensive applications, such as games, that are executed on special purpose hardware, typically referred to as a console.

The system 200 can include a front-end module 210 configured to interface with source code. The source code can be any type of source code supported by the front-end module 210. For example, the front-end module 210 can include one or more sub-modules configured to support distinct source code languages. The various source code languages can include C, Cg, Direct3D, DirectX, OpenGL, GLSL, and the like, or some other source code.

The front-end module 210 can be coupled to a translator 220 that is configured to generate an intermediate representation of the source code. The intermediate representation can be a low level code that can be used by the application processor. The intermediate representation can be of several forms such as three address code or a control flow graph with each basic block represented as a Directed Acyclic Graph (DAG).

The output of the translator 220 can be coupled to an alternate pattern identifier 230. The alternate pattern identifier 230 can be configured to scan through the instructions output by the translator 220 for predetermined instructions or patterns of instructions for which alternative instructions or patterns of instructions exist. The instructions generated by the translator 220 can represent the default or primary instructions that can be operated on by a subsequent scheduler.

The alternate pattern identifier 230 can identify the final instruction of the instruction or pattern of instructions for which at least one alternate exists. The final instruction of the primary instructions is referred to as the head instruction.

The instruction sequence generated by the translator 220 and the results from the alternate pattern identifier 230 can be coupled to, or otherwise made accessible to, an alternate pattern generator 250. The alternate pattern generator 230 can generate the alternate instruction sequences corresponding the instruction sequences identified by the alternate pattern identifier 230. For example, the alternate pattern generator 250 can generate for each alternate instruction sequence a DAG. The DAG for each of the alternate instruction sequences are not immediately added to the overall program structure. However, each of the alternate instruction sequences can be linked to the associated head instruction via a linked list 252. Thus, each primary instruction sequence may have multiple alternative instruction sequences linked to its head instruction.

An available list generator 260 can be coupled to the output of the translator 220. The available list generator 260 can be configured to generate an initial list of candidate instructions from the program code output from the translator 220. The available list generator 260 can be configured to generate the available instruction list 262 in a forward or reverse order of program code, depending on the requirements of a scheduler 270. The available list generator 260 can be configured to generate the available instruction list 262 in a reverse order when the scheduler 270 is configured as a reverse scheduler.

The available list generator 260 can be configured to select a subset of instructions that can be scheduled during a predetermined time interval. For example, a processor may implement several execution units and a single processor pass may be determined as one pass through all of the execution units. The available list generator 260 can be configured to select and track the available instructions using an available instruction list 262. As will be described in further detail below, as instructions can be removed from the available instruction list for scheduling. Once an instruction is scheduled, the available list generator 260 can update the available instruction list 262 with additional candidate instructions that become available as a result of selection and scheduling of the instruction.

The available list generator 260 can be configured to add the head instruction of a primary instruction pattern to the available instruction list 262 once it becomes available for scheduling. Additionally, the available list generator 260 can add to the available instruction list 262 the corresponding head instructions for each of the alternative instruction sequences.

A resource monitor 240 can also be coupled to the program code output from the translator 220. The resource monitor 240 can be configured to monitor the program code that remains to be scheduled and can determine or otherwise compute the resources required for the remaining code. For example, the resource monitor 240 can be configured to track the number of registers presently in use, an estimate of the amount of resources needed to schedule the reminder of the program code, and a depth, such as a dependence depth, of a critical path in the scheduled and remaining program code. The resource monitor 240 can be configured to monitor just the resources corresponding to the primary instruction pattern, or can be configured to monitor the resources for primary instruction pattern as well as one or more of the alternative instruction patterns.

A scheduler 270 can be configured to select an instruction from the available list 262 for scheduling. In the embodiment shown in FIG. 2, the scheduler 270 can be configured as a reverse look ahead scheduler.

The reverse look ahead scheduler 270 can be configured to schedule the program code in a reverse order. Thus, the reverse look ahead scheduler 270 can be configured to initially select a head instruction from the available instruction list 262 that is configured to provide a computation result from the program code. The reverse look ahead scheduler 270 can then continue to select instructions from the available instruction list 262, working upwards through each program node, until all of the instructions are scheduled.

The reverse look ahead scheduler 270 selects an instruction from the instruction list for scheduling. The reverse look ahead scheduler 270 can be configured to schedule the instructions according to one or more constraints that are used to attempt to optimize the resultant program. The operation of the reverse look ahead scheduler 270 can be similar to the operation of a conventional scheduler when scheduling instructions for which no alternative instruction pattern exists.

The reverse look ahead scheduler 270 selects an instruction from the available instruction list 262 for scheduling. The reverse look ahead scheduler 270 can utilize a scheduling criteria module 280 that is configured to examine potentially numerous scheduling and resource allocation metrics. The reverse look ahead scheduler 270 can select for scheduling the instruction having the most favorable metrics as determined by the scheduling criteria module 280.

The scheduling criteria module 280 can be configured to compare criteria determined by the resource monitor 240 against predetermined criteria. For example, the scheduling criteria module 280 can be configured to compare the number of registers in use or required for a particular candidate instruction against a desired threshold. The scheduling criteria module 280 can also be configured to compare the amount of computation resources required following scheduling of each of the candidate instructions, or compare a dependence depth of one or more paths following scheduling for each candidate instruction. Of course, the scheduling criteria module 280 may determine other metrics or perform other comparisons that may be dependent on the actual instruction chosen for scheduling.

The reverse look ahead scheduler 270 can select one of the candidate instructions from the available instruction list 262 based at least in part on the results of the scheduling criteria module 280. The reverse look ahead scheduler 270 may also look ahead one or more instructions when determining the most desirable instruction from the set of candidate instructions. The reverse look ahead scheduler 270 can, for example, look ahead one or more passes of the execution units.

As an example, the reverse look ahead scheduler 270 can attempt to maintain a number of live registers below a predetermined threshold and will attempt to select for scheduling a candidate instruction that maintains the number of live registers below the predetermined threshold. Additionally or alternatively, the reverse look ahead scheduler 270 may attempt to schedule the candidate instruction that results in the greatest reduction in computation resources required to complete scheduling or that results in the greatest reduction in a dependence depth of a path, which may be identified as a critical path.

After selecting and scheduling one of the candidate instructions from the available instruction list 262, the reverse look ahead scheduler 270 can communicate the selection to the available list generator 260. The available list generator 260 can remove the selected instruction from the available instruction list 262 and can select one or more instructions from the program code remaining to be scheduled, if any. The resource monitor 240 can also update the computation of the resources required for the remaining code.

When the reverse look ahead scheduler 270 encounters a head instruction in the available instruction list 262 linked to one or more alternative instruction patterns, the reverse look ahead scheduler 270 selects a candidate instruction to schedule from the candidate instructions that include the candidate instructions for the alternative instruction patterns. The reverse look ahead scheduler 270 selects the most desirable instruction to schedule from the available instruction list 262 based in part on the results from the scheduling criteria module 280 in combination with look ahead to one or more instructions.

If the reverse look ahead scheduler 270 selects a candidate instruction that corresponds to a head instruction for a primary instruction pattern or an alternative instruction pattern, the available list generator 260 can be configured to remove from the available instruction list 262 the non-selected instruction patterns. For example, if the reverse look ahead scheduler 270 selects the head instruction corresponding to the primary instruction pattern, the available list generator 260 can remove or otherwise discard all of the instructions for the alternative instruction patterns from the available instruction list 262. Similarly, if the reverse look ahead scheduler 270 selects the head instruction corresponding to one of the alternative instruction patterns, the available list generator 260 can remove or otherwise discard all of the instructions for the primary instruction pattern and the other alternative instruction patterns from the available instruction list 262.

The resource monitor 240 can be updated following selection of a candidate instruction to update the resources for selected instruction pattern. Once the reverse look ahead scheduler 270 selects one instruction pattern from the multiple patterns, there is no need to further monitor resources required by the non-selected instruction patterns. If the resource monitor 240 is configured to determine the resources for just the primary instruction pattern, the resource monitor 240 can be updated to determine the resources for the selected instruction sequence, which may be the primary instruction pattern.

The system 200 continues to schedule the instructions until all of the instructions have been scheduled. The system 200 has the flexibility to schedule an alternative instruction pattern based on the changing utilization of machine resources during the course of the program code. The initial selection of a instruction pattern from multiple alternatives for use throughout the entire program code does not have the flexibility of the disclosed system 200. Additionally, the system 200 can be configured to utilize scheduling criteria and metrics that are determined at the point that the instruction pattern is scheduled. Thus, the system 200 can be assured of selecting the instruction pattern that is most advantageous for the position in the program code.

Figure 3:
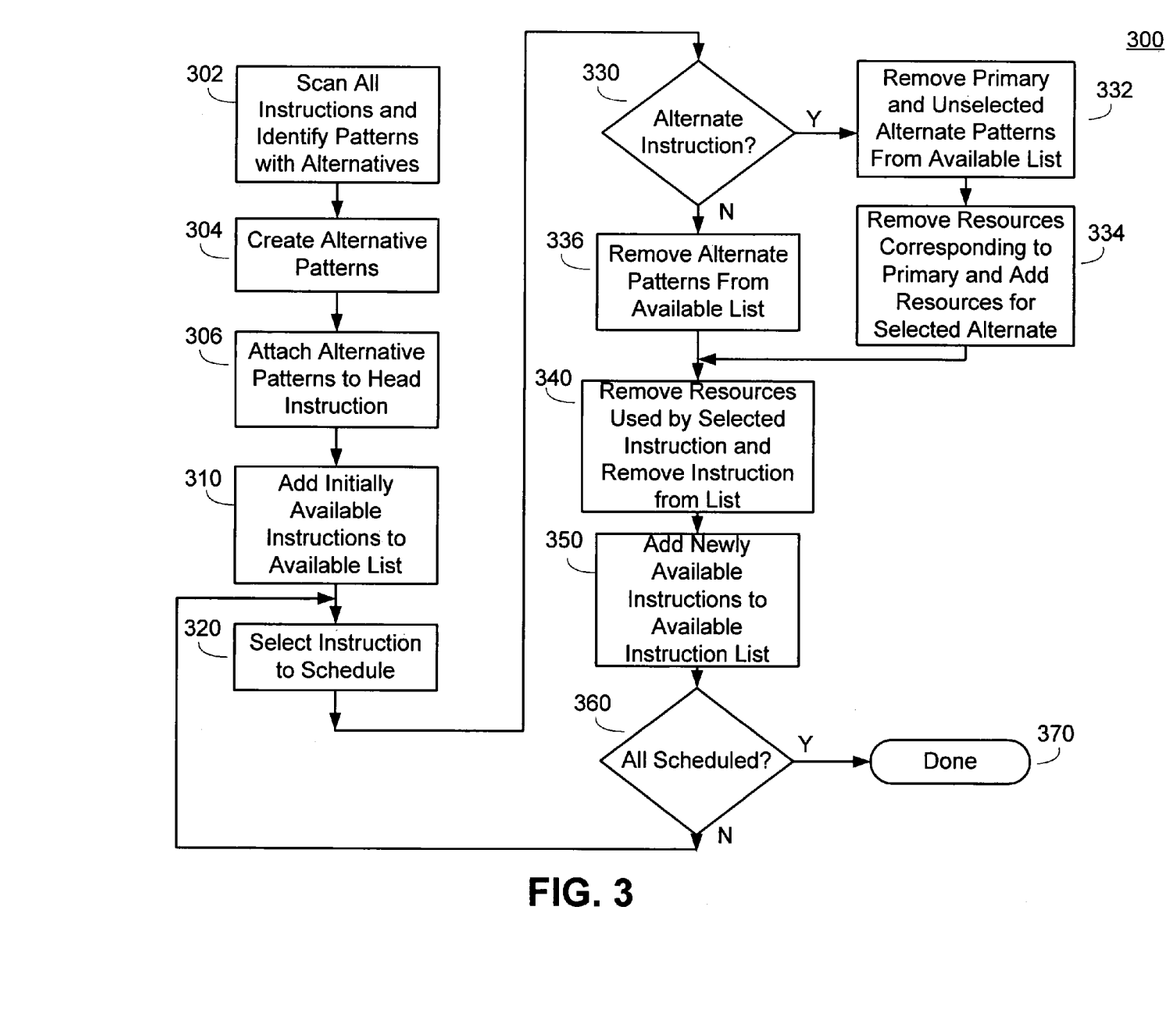
FIG. 3 is a flowchart of an embodiment of a method of dynamic instruction sequence selection.

FIG. 3 is a flowchart of an embodiment of a method 300 of dynamic instruction sequence selection. The method 300 can be performed by the system of FIG. 2, for example, in conjunction with a compiler running on a general purpose computer prior to, or during execution of program code.

The method 300 begins at block 302 where the system has access to a block of instructions for a program and desires to schedule the program code. For example, the system can translate received source code to a block of instructions for scheduling.

At block 302, the system initially scans the block of instructions for instruction predetermined patterns that have one or more alternative patterns. The predetermined instruction patterns in the block of instructions can represent the primary instruction pattern. The primary instruction pattern can include a head instruction that represents the instruction that produces the result of the primary instruction pattern. For example, the primary instruction pattern can be configured to provide a particular computation, and the head instruction can be the instruction from the primary instruction pattern that completes the computation and makes the result available. Typically, the head instruction is the final instruction of the instruction pattern.

After determining whether any instruction patterns have alternative instruction patterns, the system proceeds to block 304 to create the alternative patterns. The system can create an alternative pattern for each of the primary instruction patterns having an alternative. Some primary instruction patterns may have multiple alternative instruction patterns. The system can, for example generate a DAG for each alternative instruction pattern.

After creating the one or more alternative patterns, the system proceeds to block 306 and attaches the alternative patterns to the head instruction of the primary instruction pattern. The system can attach the alternative instructions, for example, by linking the head instructions for the alternatives to the head instruction of the primary instruction pattern.

Alternatively, the functions of blocks 302, 304, and 306 need not operate sequentially, but may operate iteratively. That is, the system can scan instructions in block 302 and can create alternative patterns, as described in block 304, each time a predetermined pattern having one or more alternative patterns is identified. Each time an predetermined pattern is identified in block 302 and alternative patterns are created in block 304, the system can proceed to block 306 and link the head instruction of the one or more alternative patterns to the head instruction of the primary instruction pattern. The system may then continue to scan instructions, and may create and link alternative patterns as predetermined patterns are identified.

The system proceeds to block 310 and populates an available instruction list with an initial set of instructions from the program code. The system can, for example, select the group of initial instructions in a reverse order. The initial set of instructions may include one or more instructions that are linked to alternative instruction patterns. If the head instruction for a primary instruction pattern is included in the available instruction list, the head instructions for all of the alternatives are also added to the available instruction list.

The system proceeds to block 320 to select an instruction to schedule from the available instruction list. A reverse look ahead scheduler can be used to select an instruction for scheduling based on one or more scheduling criteria. The reverse look ahead scheduler can take into account such criteria as the number of live registers, the amount of computation resources estimated for the remainder of the code needing to be scheduled, the dependence depth of one or more paths identified as critical paths, and other criteria. The reverse look ahead scheduler can look ahead a predetermined number of instructions or a predetermined number of execution unit passes when making the instruction selection decision.

The reverse look ahead scheduler can evaluate the one or more alternative instruction patterns at various stages within the look ahead. That is, the reverse look ahead scheduler can evaluate the machine resources required, register pressures, and dependency depths prior to the point of actually scheduling one of the alternative head instructions. The reverse look ahead scheduler can evaluate the various scheduling criteria in advance of actually scheduling a head instruction from the alternative head instructions in order to further optimize the scheduling of instructions.

After selecting an instruction from the available instruction list and scheduling the instruction, the system can proceed to decision block 330. At decision block 330, the system can determine if the selected and scheduled instruction corresponds to a head instruction of an alternative instruction pattern. For example, the instruction selected for scheduling can correspond to an instruction that is not linked to any alternative patterns. The instruction selected for scheduling can correspond to the head instruction of a primary instruction pattern that is linked to one or more alternative instruction patterns. Alternatively, the instruction selected for scheduling can correspond to a head instruction for one of the alternative instruction patterns.

If, at decision block 330, the system determines that the selected instruction corresponds to an instruction having no alternatives or the head instruction of a primary instruction pattern, the system proceeds to block 336. At block 336, the system removes from the available instruction list the alternative head instructions, if any, that are linked to the selected instruction. The system then proceeds to block 340.

If, at decision block 330; the system determines that the selected instruction corresponds to a head instruction for one of the alternative instruction patterns, the system proceeds to block 332. At block 332, the system removes from the available instruction list the primary head instruction and the unselected alternative head instructions linked to the selected instruction. There is no longer a need to track instructions for the primary pattern or any of the other alternatives because the scheduler has selected a head instruction for one particular alternative instruction pattern.

After updating the available instruction list, the system can proceed to block 334. At block 334, the system removes the resources corresponding to the primary instruction pattern and adds the resources corresponding to the selected alternative instruction pattern to a resource monitor.

Prior to selecting an instruction from an alternative instruction pattern for scheduling, a resource monitor can estimate the amount of computation resources needed to complete the scheduling of the program code. The resource monitor can be configured to generate the estimate using the primary instruction patterns. The primary instruction pattern and the alternative instruction patterns can each be multiple instructions in length. Thus, when an alternative instruction pattern is selected in place of a primary instruction pattern, the system can update the resource estimate to reflect the resources needed by the selected alternative instruction pattern.

After updating the resource estimate, the system can proceed to block 340. At block 340, the system updates the resource estimate by removing the resources used by the selected and scheduled instruction and removes the scheduled instruction from the available list of instructions to be scheduled. As described above, a resource monitor can track an estimate of the computation resources needed to complete scheduling of the program. As an instruction is scheduled, the actual resources used by that instruction can be removed from the estimate.

After updating the resource estimate, the system can proceed to block 350. At block 350, the system can update the available instruction list with additional instructions, if any that become available for scheduling as a result of the selected instruction.

After updating the available instruction list with additional instructions, the system proceeds to decision block 360 to determine if the entire program code is scheduled. If not, the system returns to block 320 to again select an instruction from the available instruction list. If, at decision block 360, the system determines that the scheduling of the program code is compete, the system proceeds to block 370 and the method 300 is done.

Therefore, the system can perform the method of FIG. 3 in order to dynamically select an instruction sequence to schedule from a plurality of instruction sequences. The system can select different alternative instruction patterns for different instances of the same primary instruction pattern depending on the position of the primary instruction pattern within the program code. The system can also select the alternative instruction pattern based on the utilization of resources at the time that the instruction sequence is scheduled. For example, a first instance of a primary instruction pattern occurring within program code may be preferable over all alternative sequence sets. However, at another instance of the primary instruction pattern occurring at another location within the program code, the system may select an alternative instruction pattern because the machine resources may be register constrained and a particular alternative instruction sequence may allow a different register utilization that is preferable at this point in the program code. Therefore, an alternative instruction pattern is not selected prior to scheduling of the program code, but instead, can be selected at the time that the instruction pattern is selected for scheduling.

A method and system for dynamic instruction sequence scheduling is described herein. The method and system allows program code to be dynamically scheduled using any one of multiple alternative instruction patterns. An instruction pattern from a plurality of instruction patterns can be selected at the time that the instructions are scheduled. The selection can be based on one or more predetermined scheduling criteria.

Prior to instruction scheduling, a list of instructions is scanned for instruction patterns having alternative patterns. When a primary set of instructions is identified, one or more alternative sets of instructions that calculate the same result can be created and connected together. For example, a DAG just for that computation can be created but is not added to the overall program structure. A separate DAG can be maintained for the overall program block having the primary instruction pattern. The new sets of instructions can be linked via linked list to the head instruction of the primary set of instructions.

A look-ahead list scheduler can used for scheduling. Before scheduling, each instruction can be updated with required machine resources. The scheduler, which can be a reverse look ahead scheduler, can calculate an initial list of all available candidate instructions. The available candidate list can be updated as the scheduler proceeds with scheduling of the program code.

When an instruction is scheduled, it is removed from available candidate list and new instruction candidates that become available as a result of the scheduling are added to available candidate list. When a head instruction that is linked to one or more alternative instruction patterns becomes available to be added to the available candidate list, the heads of the primary and all alternate instruction patterns can be added to the available candidate list. Scheduling then proceeds as usual selecting the primary, alternative or other instructions.

When a head instruction of primary instruction pattern is selected, the heads of all alternative instruction patterns linked to the selected instruction are removed from the available list and discarded. When a head instruction of alternative instruction pattern is scheduled, the set of machine resources needed by the set of primary instructions is removed from the outstanding machine resources required, and the set of machine resources needed by the set of alternative instructions is added to the outstanding machine resources required. The primary instruction and other non-selected alternative instructions linked to the selected instruction are removed from the available list. The scheduler repeats the process until all of the instructions are scheduled.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of dynamic instruction scheduling, the method comprising:
    identifying within a block of program code to be scheduled a primary instruction pattern having at least one corresponding alternative instruction pattern;
    associating a head instruction of the primary instruction pattern to a head instruction of each of the at least one corresponding alternative instruction pattern;
    adding the head instruction of the primary instruction pattern and the head instructions of each of the at least one corresponding alternative instruction pattern to an available instruction list;
    selecting one of the head instructions of the primary instruction pattern or at least one corresponding alternative instruction pattern for scheduling; and
    scheduling a selected one of the head instructions.

2. The method of claim 1, further comprising:
    generating a Directed Acyclic Graph (DAG) for the primary instruction pattern and each of the at least one corresponding alternative instruction pattern; and
    connecting the DAG for the primary instruction pattern to a DAG corresponding to a remaining portion of the block of program code.

3. The method of claim 1, further comprising generating an estimate of computation resources needed to schedule an unscheduled portion of the block of program code for use when selecting one of the head instructions for scheduling.

4. The method of claim 3, wherein generating the estimate of computation resources comprises generating the estimate of computation resources using resources associated with the primary instruction pattern.

5. The method of claim 4, further comprising updating the estimate of computation by replacing the resources associated with the primary instruction pattern with resources associated with a selected alternative instruction pattern when the head instruction associated with the selected alternative instruction pattern is scheduled.

6. The method of claim 1, further comprising removing the head instructions for non-selected instruction patterns linked to a selected head instruction from the available instruction list after one of the head instructions is selected for scheduling.

7. The method of claim 1, wherein associating the head instruction of the primary instruction pattern to the head instruction of each of the at least one corresponding alternative instruction pattern comprises generating a linked list linking the head instruction of the primary instruction pattern to the head instruction of each of the at least one corresponding alternative instruction pattern.

8. The method of claim 1, wherein selecting one of the head instructions for scheduling comprises selecting a desired head instruction based at least in part on predetermined scheduling criteria.

9. The method of claim 8, wherein the predetermined scheduling criteria includes at least one criterion selected from the list comprising a number of active registers, an estimate of resources needed to complete scheduling of the block of program code, and a dependence depth of a path within the block of program code.

10. The method of claim 1, wherein selecting one of the head instructions for scheduling comprises selecting a desired head instruction using a reverse look ahead scheduler.

11. A method of dynamic instruction scheduling, the method comprising:
scanning instructions in a block of program code for a primary instruction pattern having at least one corresponding alternative instruction pattern;
generating the at least one corresponding alternative instruction pattern;
linking a head instruction of each of the at least one corresponding alternative instruction pattern to a head instruction of the primary instruction pattern;
populating an available instruction list with the head instructions of the primary instruction pattern and the at least one corresponding alternative instruction pattern;
selecting a selected head instruction from the available instruction pattern using a reverse look ahead scheduler;
removing from the available instruction list the heads instructions linked to the selected head instruction; and
scheduling the selected head instruction.

12. The method of claim 11, further comprising:
generating an estimate of computation resources needed to schedule a remaining portion of the program code based on the primary instruction pattern; and
updating the estimate of computation resources when using a desired alternative instruction to which the selected head instruction is associated.

13. The method of claim 11, further comprising removing from the available instruction list instructions from the primary instruction pattern and at least one corresponding instruction pattern not associated with the selected head instruction.

14. The method of claim 11, further comprising populating the available instruction list with a number of instructions exceeding a look ahead length of the reverse look ahead scheduler.

15. A method of dynamic instruction scheduling, the method comprising:
identifying within a program block to be scheduled a first instance of a primary instruction pattern;
identifying within the program block a second instance of the primary instruction pattern;
generating a plurality of alternative instruction patterns corresponding to the primary instruction pattern;
scheduling, based at least in part on scheduling criteria, a first alternative instruction pattern in place of the first instance of the primary instruction pattern; and
scheduling, based at least in part on scheduling criteria, a second alternative instruction pattern, distinct from the first alternative instruction pattern, in place of the second instance of the primary instruction pattern.

16. A system for dynamic instruction scheduling, the system comprising:
an alternate pattern identifier configured to scan a block of program code to be scheduled for a primary instruction pattern;
an alternate pattern generator configured to generate at least one alternative instruction pattern corresponding to the primary instruction pattern;
an available list generator configured to add a head instruction from each of the primary instruction pattern and the at least one alternative instruction pattern to an available instruction list;
a scheduling criteria module configured to generate at least one scheduling metric; and
a scheduler configured to select a desired head instruction from the available instruction list based at least in part on the at least one scheduling metric and schedule the desired head instruction.

17. The system of claim 16, further comprising a resource monitor configured to determine utilization of at least one scheduling resource for an unscheduled portion of the block of program code using the primary instruction pattern.

18. The system of claim 16, wherein the scheduling criteria module is configured to determine a change in the at least one scheduling metric based on a selection of a candidate instruction from the list of available instructions.

19. The system of claim 16, wherein the at least one scheduling metric includes at least one metric selected from the group comprising a number of live registers, an estimate of computation resources needed to schedule a remaining portion of program code, and a dependence depth of a path within the program code.

20. The system of claim 16, wherein the alternate pattern generator is configured to generate a linked list linking the head instruction from the primary instruction pattern to each head instruction of the at least one alternative instruction pattern.

21. The system of claim 16, wherein the scheduler comprises a reverse look ahead scheduler.

* * * * *